(12) United States Patent
Sugahara et al.

(10) Patent No.: US 8,174,854 B2
(45) Date of Patent: May 8, 2012

(54) SWITCHING POWER SUPPLY SYSTEM WITH REDUCED CURRENT CONSUMPTION AT LIGHT LOAD

(75) Inventors: Satoshi Sugahara, Matsumoto (JP); Kouhei Yamada, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 833 days.

(21) Appl. No.: 12/051,836

(22) Filed: Mar. 19, 2008

(65) Prior Publication Data

US 2008/0247198 A1 Oct. 9, 2008

(30) Foreign Application Priority Data

Mar. 20, 2007 (JP) ................. 2007-073499

(51) Int. Cl.
*H02H 7/12* (2006.01)
(52) U.S. Cl. ............ 363/50; 323/351; 327/174
(58) Field of Classification Search .......... 363/50, 363/51–56.03, 56.05–56.11; 323/351; 361/18; 327/174
See application file for complete search history.

(56) References Cited

U.S. PATENT DOCUMENTS

| 5,568,044 | A * | 10/1996 | Bittner ................. 323/272 |
| 6,614,277 | B1 * | 9/2003 | Martini ................. 327/227 |
| 6,624,995 | B2 * | 9/2003 | Barrow et al. ........ 361/103 |

FOREIGN PATENT DOCUMENTS

| JP | 02097139 A | * | 4/1990 |
| JP | 11-178207 | | 7/1999 |
| JP | 2003-284241 | | 10/2003 |
| JP | 2005-006442 | | 1/2005 |

* cited by examiner

*Primary Examiner* — Harry Behm
(74) *Attorney, Agent, or Firm* — Rabin & Berdo, P.C.

(57) ABSTRACT

A switching power supply system has a control circuit that controls an output voltage by causing a switching device to turn ON and OFF. The control circuit includes a control pulse supplying unit that supplies a pulsed signal that keeps the switching device turned-ON and -OFF. A protection circuit shuts down the switching power supply system upon occurrence of an abnormality. A delay circuit produces a delay signal that delays by a specified time duration the termination of a state of the pulsed signal in which the pulsed signal keeps the switching device turned-ON. The protection circuit is responsive to the pulsed signal or the delay signal to switch between an operation state and a stand-by state.

12 Claims, 13 Drawing Sheets

(HEAVY LOAD)

(LIGHT LOAD)

(HEAVY LOAD)

(LIGHT LOAD)

SWITCHING POWER SUPPLY SYSTEM WITH REDUCED CURRENT CONSUMPTION AT LIGHT LOAD

BACKGROUND OF THE INVENTION

1. Field of the Invention

The present invention relates to a circuit and method for a switching power supply system. Particularly, the invention relates to a circuit and a method for controlling values, such as voltage and current, of the electric power outputted from a main unit of a switching power supply system by controlling the duty ratio in the ON/OFF operation of a switching device, in such a manner that it reduces internal current consumption during times of light or no load so as to increase the output conversion efficiency of the switching power supply.

2. Description of the Background Art

FIG. 5 is a block diagram showing an arrangement of a current ordinary switching power supply system. Such a switching power supply system is formed with a main unit and a control block.

The main unit converts the inputted electric power to an output. A DC-DC converter 92 is used for the main unit in the arrangement of FIG. 5 (although various kinds of devices including components such as inverters and converters also could be used for the main unit).

The control block, which is a control circuit 91 for the system shown in FIG. 5, controls the main unit. The control block 91 includes a duty ratio control circuit 911, a logic circuit 912 and a protection circuit 913. The control block 91 also includes analog circuits such as a reference voltage circuit and a bias circuit and other logic circuits. These latter circuits, however, have no direct connection to an explanation of the operation of the switching power supply system here, and the explanations thereof are omitted.

In the switching power supply system shown in FIG. 5, the output voltage VOUT of the DC-DC converter 92 is fed back to the duty ratio control circuit 911 in the control block 91. The duty ratio control circuit 911 outputs a pulsed signal VCONT with its duty ratio being controlled according to the error between the output voltage VOUT and a target output voltage. The duty ratio is a ratio of the length of time that the level of the outputted pulse is at HIGH (a voltage value at a high level in a binary form of a low level voltage value and a high level voltage value) or at LOW (a voltage value at a low level in the binary form of the low level voltage value and the high level voltage value) to the period of the pulse. Furthermore, the pulsed signal VCONT, with its duty ratio being controlled, performs ON/OFF control of switching devices provided in the DC-DC converter 92, such as semiconductor switching devices represented by bipolar transistors and MOSFETs or mechanical switching devices represented by relay circuits. The output voltage VOUT is controlled by this ON/OFF control.

Moreover, by means of an external startup/shutdown signal, startup/shutdown of the switching power supply system can generally be carried out. In the system shown in FIG. 5, by externally applying a startup/shutdown signal VE1 to the control block 91, its startup (and operation)/shutdown is carried out.

In order to protect the power supply system, the protection circuit 913 includes a circuit that monitor an inputted voltage VIN, an input current, the temperature of a power supply, an output voltage or an output current. When the presence of a specified abnormal state is detected using one of these kinds of monitoring, the protection circuit 913 outputs a power supply shutdown signal VE2 to lead the power supply to a shutdown.

The logic circuit 912 produces a signal VE3 on the basis of the startup/shutdown signal VE1 and the power supply shutdown signal VE2, to output the signal VE3. When the startup/shutdown signal VE1 is a signal indicating starting-up, and the power supply shutdown signal VE2 is a signal indicating a normal state, the signal VE3 is outputted as a signal for starting up the power supply. When the startup/shutdown signal VE1 is a signal indicating shutdown or the power supply shutdown signal VE2 is a signal indicating the presence of an abnormal state, the signal VE3 is outputted as a power supply shutdown signal for shutting down the power supply system.

FIG. 6 to FIG. 13 illustrate examples of possible circuit configurations of the DC-DC converter 92 in the current switching power supply system shown in FIG. 5. In each of the examples, a switch S1 shown in each of the figures and a switch S2 shown in each of FIGS. 7, 9, 11 and 13 are subjected to ON/OFF control by the duty ratio control pulsed signal VCONT outputted from the duty ratio control circuit 911 in the control block 91.

Letting the duty ratio of the switch S1, that is the ratio of the duration of the on-state of the switch S1 to its switching period, be D1 and the duty ratio of the switch S2, that is the ratio of the duration of the on-state of the switch S2 or a diode D2 to its switching period, be D2, the output voltage VOUT is calculated by the following expressions when the internal loss of the power supply is neglected.

In the circuits shown in FIG. 6 and FIG. 7, which use a down-converter, the output voltage VOUT is calculated by the expression VOUT=VIN*D1/(D1+D2).

In the circuits shown in FIG. 8 and FIG. 9 which use an up-converter, the output voltage VOUT is calculated by the expression VOUT=VIN*(D1+D2)/D2.

In the circuits shown in FIG. 10 to FIG. 13, which use a buck-boost converter or a flyback converter, the output voltage VOUT is calculated by the expression VOUT=VIN*D1/D2.

By adjusting the duty ratio of the duty ratio controlled pulsed signal VCONT outputted from the duty ratio control circuit 911 in the control block 91, the power attribute value (here, the voltage value) of the output voltage is controlled.

In current switching power supply systems provided with a DC-DC converter such as those shown in each of FIG. 6 to FIG. 13, the amount of switching losses, such as those due to parasitic resistance within the power supply and losses due to power used to drive the control circuit, increase to thereby reduce output conversion efficiency.

Moreover, in a battery-powered device such as a portable cell phone, when the device is in a stand-by state, components such as a CPU (Central Processing Unit) and a DSP (Digital Signal Processor) as loads of a switching power supply are sometimes shut down to extend the life of the battery. In this case, the switching power supply system is brought into a no-load state. Nevertheless, even though loads (those such as a CPU and a DSP) are made to shut down to reduce their driving losses, a loss accompanying switching of the switching power supply system and a loss due in driving the control circuit are still produced.

Thus, for reducing current consumption under no-load or light-load conditions, the following approach is widely taken. Control with PWM (Pulse Width Modulation) with a fixed switching period is carried out at heavy load and, at no-load or light load, PFM (Pulse Frequency Modulation) or an operation of stopping the switching operation for a certain duration (i.e. an intermittent operation) is carried out, thereby to make the average period of the switching longer than that at heavy load. This reduces the switching loss at no-load or light load. Also, if PFM control is adopted for loads ranging from light to heavy, the average period of the switching becomes longer than that at heavy load. Thus, the switching loss at no-load or light load can be reduced.

With this approach, however, although the loss accompanying switching is reduced, driving losses in analog circuits in the control circuit and in circuits independent of switching operations cannot be reduced. In particular, in the protection circuit, current consumption is in the range of tens to hundreds of microamperes. The power loss due to current consumption is a main loss in the control circuit in a no-load state. At present, a portable electronic device such as a cellular phone is required to reduce current consumption at no-load in its switching power supply system down to the tens of microamperes range or less.

For example, Japanese patent publication number JP-A-2003-284241, proposes that protection circuits be rendered so as not to operate in a voltage regulator and a DC-DC converter when their respective load current values are less or equal to specified values. With the method proposed in JP-A-2003-284241, although low current consumption can be achieved, there is a problem that the presence or absence of an abnormal state cannot be monitored at no-load or light load. The invention was made in view of the above-described problems.

SUMMARY OF THE INVENTION

The control circuit of the switching power supply system according to the invention includes a delay circuit that produces a delay signal on the basis of a pulsed signal supplied from a control pulse supplying unit for controlling the ON/OFF state of switching devices in the switching power supply system. The delay signal or the pulsed signal controls the operation/stand-by state of the protection circuit. The delay signal is an equivalent of the pulsed signal for controlling the ON/OFF state of the switching devices in the switching power supply system, with the delay signal delaying by a specified time the termination of the state of the pulsed signal that maintains the switching device turned ON.

Moreover, the control method according to the invention includes supplying a pulsed signal that maintains the switching devices in the switching power supply system turned-ON/OFF and causes the protection circuit switch between its operation/stand-by states in response to the delay signal or the pulsed signal. The delay signal is the signal by which the termination of the state of the pulsed signal that maintains the switching device turned-ON, is delayed by a specified time. The pulsed signal is the signal controlling the ON/OFF of switching devices in the switching power supply system.

With the control circuit and the control method of the switching power supply system according to the invention, the foregoing arrangement enables the protection circuit to monitor the presence or absence of an abnormality at least while the pulsed signal continues to keep the switching device turned-ON. Moreover, when the period of the pulsed signal is increased at light load or no-load, a signal is sometimes produced which instructs the protection circuit to be brought to the stand-by state. At that time, it becomes possible to bring the protection circuit to the stand-by state to reduce internal power consumption.

DESCRIPTION OF THE PREFERRED EMBODIMENTS

In the following, detailed explanations will be made about a preferred embodiment of a control circuit and a control method of the switching power supply system according to the invention with reference to the drawings.

Figure 1:
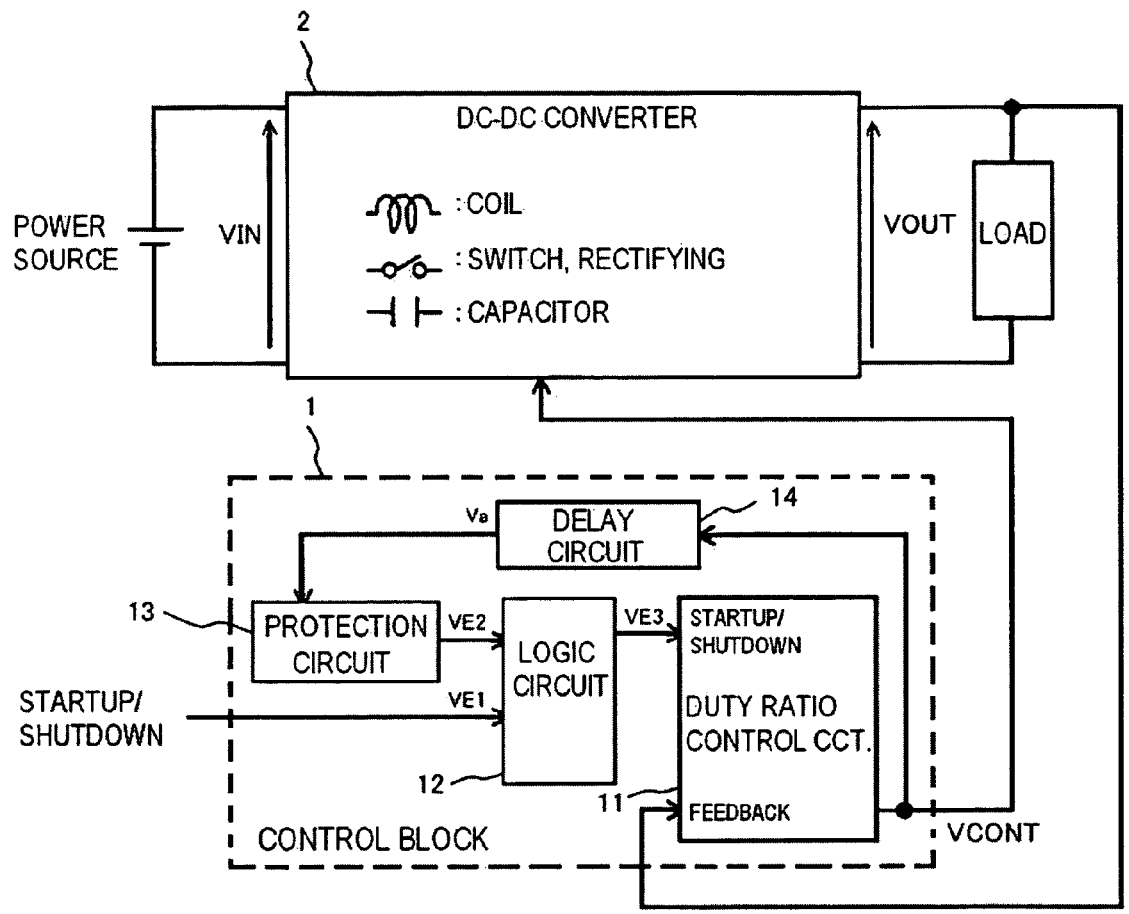
FIG. 1 is a block diagram showing an arrangement of a switching power supply system using a control block according to an embodiment of the invention.

FIG. 1 is a block diagram showing an arrangement of a switching power supply system according to an embodiment the invention having a control block, 1 and a main unit in the form of a DC-DC converter 2. The DC-DC converter 2 converts inputted electric power to a resulting output. The control block 1 controls the main unit, and is includes a duty ratio control circuit 11 (corresponding to the control pulse supplying unit), a logic circuit 12, a protection circuit 13 and a delay circuit 14. The control block 1 also includes analog circuits such as a reference voltage circuit and a bias circuit and other logic circuits. These latter circuits, however, have no direct connection to the explanation of the switching power supply system according to the invention here, and explanations thereof accordingly are omitted.

Although the switching power supply system according to the embodiment is provided with the DC-DC converter 2, in the switching power supply system according to the invention, the main unit of the switching power supply system generally can be formed with various kinds of devices including components such as inverters and converters. Moreover, the DC-DC converter 2 can be of conventional design.

Moreover, in some conventional switching power supply systems, startup/shutdown of the systems can be carried out by means of external startup/shutdown signals. In a like manner, the system shown in FIG. 1 can be started up (and maintained in operation) and shut down, by an externally supplied startup/shutdown signal VE1 applied to the control block 1.

In accordance with the operation of the switching power supply system according to the embodiment, the output voltage VOUT of the DC-DC converter 2 is fed back to the duty ratio control circuit 11 in the control block 1, which outputs a pulsed signal VCONT. The duty ratio of the circuit 11 is controlled according to the error between the fed back voltage VOUT and a target output voltage. Furthermore, with its duty ratio being controlled, the pulsed signal VCONT carries out ON/OFF control of switching devices provided in the DC-DC converter 2 including semiconductor switching devices represented by bipolar transistors and MOSFETs or mechanical switching devices represented by relay circuits. By such ON/OFF control, the output voltage VOUT is controlled.

In order to protect the power supply system, the protection circuit 13 monitors, for example, an inputted voltage VIN of an inputted power supply, an input current, the temperature of a power supply, or an output voltage or current. When the presence of a specified abnormal state is detected by monitoring any one of these, the protection circuit 913 outputs a power supply shutdown signal VE2, leading the power supply to be shutdown.

The logic circuit 12 produces a logical product signal VE3 on the basis of the startup/shutdown signal VE1 and the power supply shutdown signal VE2 to output the logical product signal VE3 to the duty ratio control circuit 11. When the startup/shutdown signal VE1 is a signal indicating starting-up or operation thereafter, and the power supply shutdown signal VE2 is a signal indicating a normal state, the logical product signal VE3 is outputted as a power supply starting-up signal. When the startup/shutdown signal VE1 is a signal indicating shutdown or the power supply shutdown signal VE2 is a signal indicating the presence of an abnormal state, the logical product signal VE3 is outputted as a power supply shut-down signal that cause the switching power supply system to shut down.

The delay circuit 14 takes the pulsed signal VCONT, which is the output signal from the duty ratio control circuit 11, as an input signal and outputs a signal Va for switching between the operation and stand-by states of the protection circuit 13.

Figure 2:
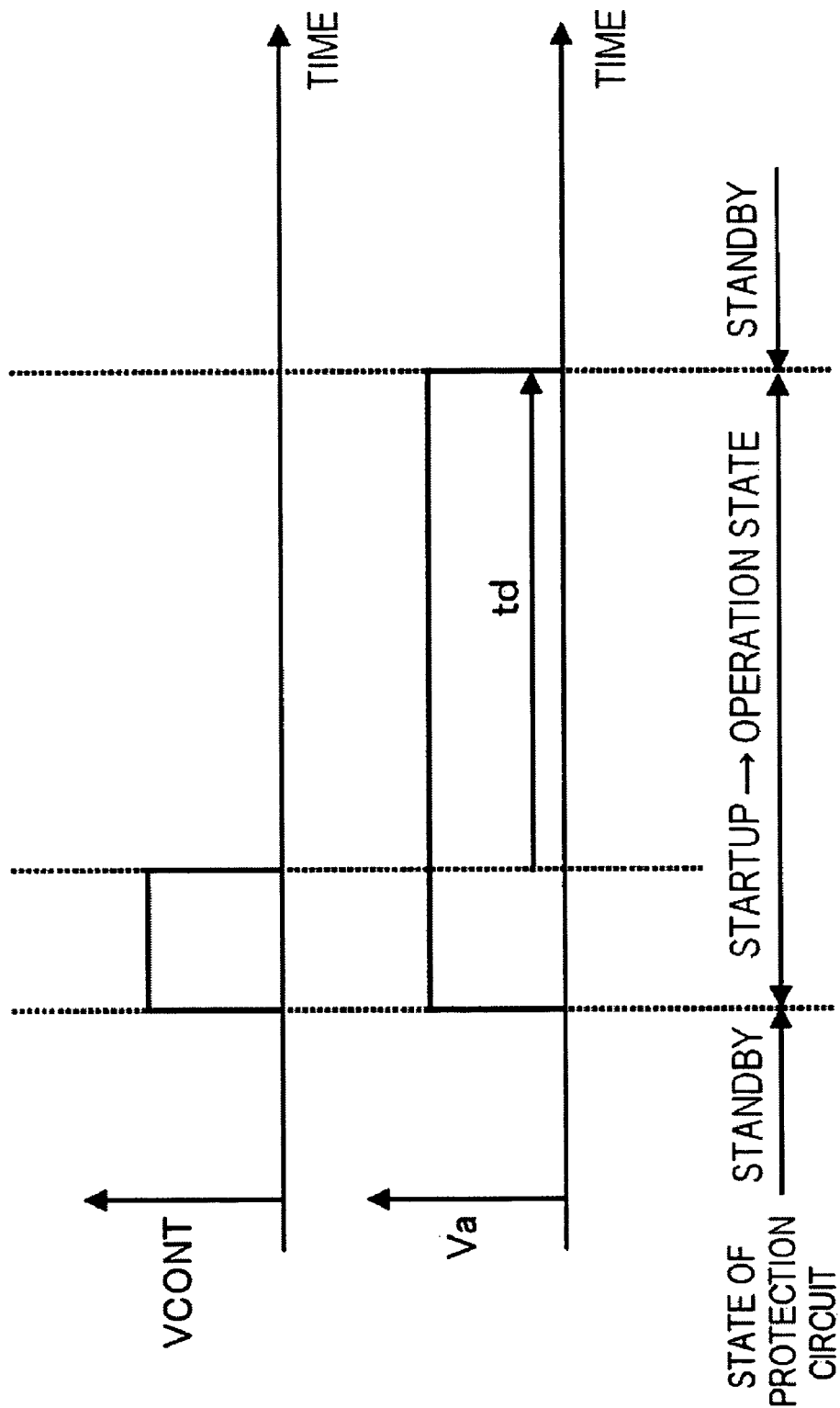
FIG. 2 is a timing chart showing the operation of the control block according to the embodiment of the invention.

FIG. 2 is a timing chart showing the operation of the control block 1 according to the embodiment of the invention. Hereafter the operation of the control block 1 provided with the delay circuit 14 will be explained with reference to FIG. 1 and FIG. 2. This operation includes a control method of control according to the invention.

Incidentally, it is assumed that a main switch (the switch S1 shown in FIG. 6 to FIG. 13, for example) is turned ON when the level of the pulsed signal VCONT shown in FIG. 1 to FIG. 4B is at HIGH and is turned-OFF when the level of the pulsed signal VCONT is at LOW. Moreover, it is assumed that the protection circuit 13 is brought into the operation state when the level of the signal Va for switching between the operation and stand-by states of the protection circuit 13 is at HIGH and brought into the stand-by state when the level of the signal Va is at LOW. The logic levels of each of the signals may have their polarities appropriately reversed without departing from the scope of the invention.

As shown in FIG. 2, with the level of the pulsed signal VCONT brought to HIGH, the level of the signal Va becomes HIGH to switch the protection circuit from the stand-by state to the operation state. Thereafter, even though the level of the pulsed signal VCONT is switched to LOW, the delay circuit 14 holds the state of the signal Va at HIGH as the operation state for a specified extended duration td before switching the state of the signal Va to LOW as the stand-by state.

The reason to extend the duration of the signal Va, during which its level is at HIGH, longer than the duration of the pulsed signal VCONT, during which its level is at HIGH, is as follows. This extension of the duration of the signal Va provides time necessary for the protection circuit 13, switched from the stand-by state to the operation state, decide upon the presence or absence of an abnormality and output the result of the decision even after the level of the pulsed signal VCONT is changed to LOW. Therefore, the extended time td is to be adjusted so that sufficient time is provided even after the level of the pulsed signal VCONT is changed to LOW.

In the operation shown in FIG. 2, a system has performed so that a change in the level of the signal Va from HIGH to LOW occurs after the level of the pulsed signal VCONT is changed from HIGH to LOW with further extension in the duration by td. This may be arranged so that the level of the signal Va is maintained at HIGH for a specified duration after the level of the pulsed signal VCONT or the signal Va changes from LOW to HIGH (such a signal Va corresponds to the delay signal).

Moreover, when the protection circuit 13 can carry out the switching from the stand-by state to the operation state, the decision as to the presence or absence of an abnormality and the outputting of the result within the duration in which the level of the pulsed signal VCONT is HIGH, the delay circuit 14 can be eliminated with the pulsed signal VCONT used as the signal Va. The switching for determining which kind of signal is to be used as the signal Va may be carried out by comparing the duration, necessary for the protection circuit 13 to carry out the switching from the stand-by state to the operation state, the decision as to the presence or absence of an abnormality and the outputting of the result, with the duration within which the level of the pulsed signal VCONT is at HIGH (i.e. the duration in which the switching device is made turned-ON). Namely, when the latter is longer, the pulsed signal VCONT can be used as the signal Va. While, when the former is longer, the signal Va, explained with reference to FIG. 2 and taken as the delay signal in the above explanation, can be used as it is.

The change in the level of the signal Va to LOW brings the protection circuit 13 to a stand-by state. As was described in the foregoing, the protection circuit 13 is operated only when the level of the signal Va is at HIGH to consume electric power, during which the presence or absence of an occurrence of an abnormality can be monitored. When the level of the signal Va is at LOW, the protection circuit 13 is brought to the stand-by state. In the stand-by state, only the circuit elements necessary for rapidly starting up the protection circuit 13 or only the circuit elements necessary for holding an output signal are operated to therefore bring the protection circuit 13 into a low power consumption state. When the protection circuit 13 in the stand-by state necessitates no rapid starting-up, an arrangement can be provided which brings all of the circuit elements in the protection circuit 13 in the stand-by state into a shutdown state.

By carrying out the above operation, also at no-load or light load, the protection circuit 13 repeats its operation/stand-by states in accordance with the switching operation, based on the pulsed signal VCONT to make it possible to monitor the presence or absence of an abnormal state. In addition, during the time period within which the protection circuit 13 is in the stand-by state, power consumption is only for operating limited circuit elements necessary for rapidly starting up the protection circuit 13 or limited circuit elements necessary for maintaining outputted signals. Therefore, within this period, the protection circuit 13 is in a low power consumption state. Furthermore, with the duty ratio control circuit 11 making the outputted pulsed signal VCONT operated by PFM or operated intermittently to thereby extend an average period of switching, the proportion of this period duration within which the level of the signal Va is at LOW becomes larger than the proportion of this period within which the level of the signal Va is at HIGH. Therefore, the proportion of the this period within which the protection circuit 13 is in a stand-by state becomes larger than the proportion of this period within which the circuit 13 is in an operation state. This enables reduction in average power consumption in the protection circuit 13.

Figure 3A:
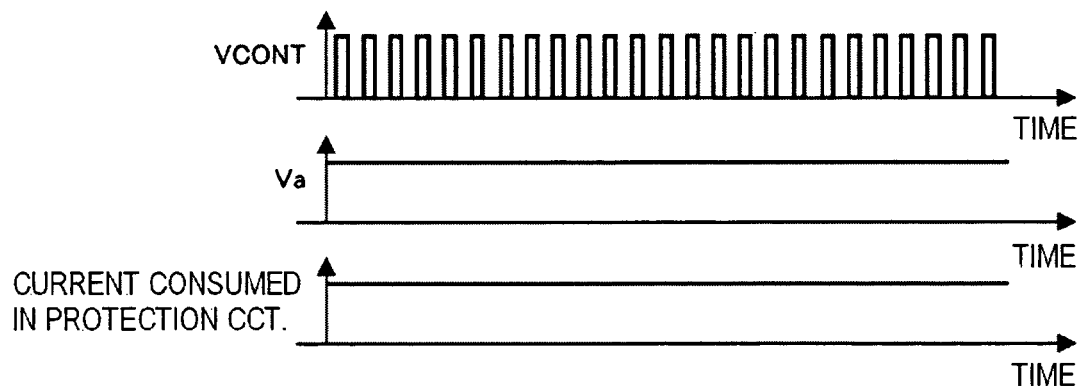
FIG. 3A shows exemplary waveforms of a pulsed signal VCONT, a signal Va and a consumed current in a protection circuit at heavy load in a control block according to the embodiment of the invention.
Figure 3B:
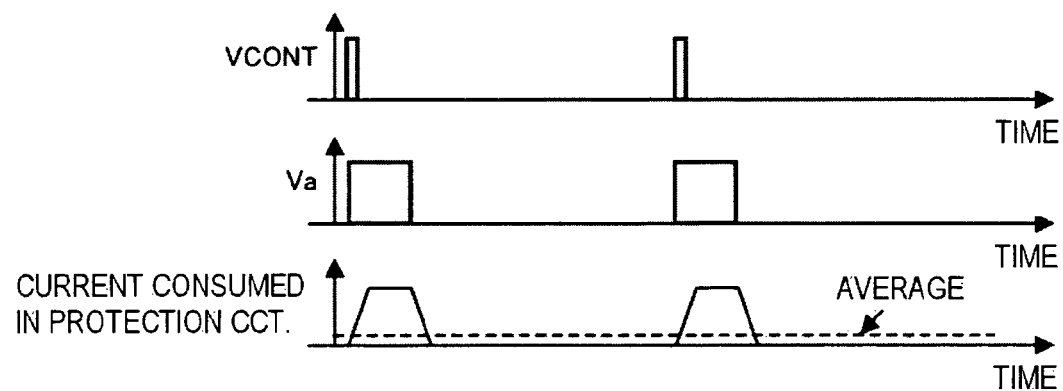
FIG. 3B shows exemplary waveforms of the pulsed signal VCONT, the signal Va and the consumed current in a protection circuit at light load in the control block according to the embodiment of the invention.

FIGS. 3A and 3B are waveform diagrams each showing an example of the waveforms of the pulsed signal VCONT, the signal Va and the current consumed in the protection circuit 13 according to the embodiment of the invention. FIG. 3A shows the waveforms at heavy load and FIG. 3B shows the waveforms at light load.

The waveforms exemplified in each of FIGS. 3A and 3B are those of the signals and consumed current when the duty ratio control circuit 11 uses PWM with a heavy load and uses PFM with a light load, or when the duty ratio control circuit 11 carries uses PFM over entire range of the load.

At a time of heavy load, the waveforms during which are shown in FIG. 3A, a short switching period provided by the pulsed signal VCONT causes the level of the output signal Va of the delay circuit 14 always to be at HIGH to bring the protection circuit 13 always into an operation state.

At a time of light load, the waveforms during which are shown in FIG. 3B, the switching period provided by the pulsed signal VCONT becomes longer to present a period within which the level of the output signal Va of the delay circuit 14 is brought to LOW. During this period, the protection circuit 13 is brought to a stand-by state, by which the average current consumption in the protection circuit 13 is reduced. The period becomes longer as the load becomes lighter and longest at no load, such that the reduction in the current consumption of the protection circuit becomes greater as the load is reduced.

Incidentally, although the pulse width of the pulsed signal VCONT shown in FIG. 3A is drawn as being equal to the pulse width of the pulsed signal VCONT shown in FIG. 3B, these pulse widths are of course not always equal to each other in a PWM operation.

Figure 4A:
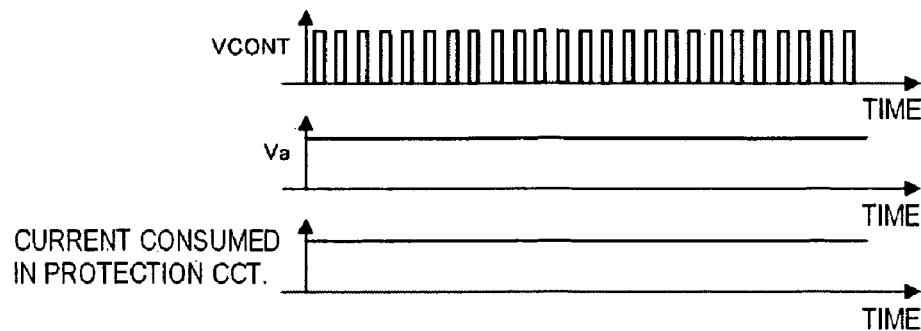
FIG. 4A shows other exemplary waveforms of the pulsed signal VCONT, the signal Va and the consumed current in a protection circuit at heavy load in the control block according to the embodiment of the invention.
Figure 4B:
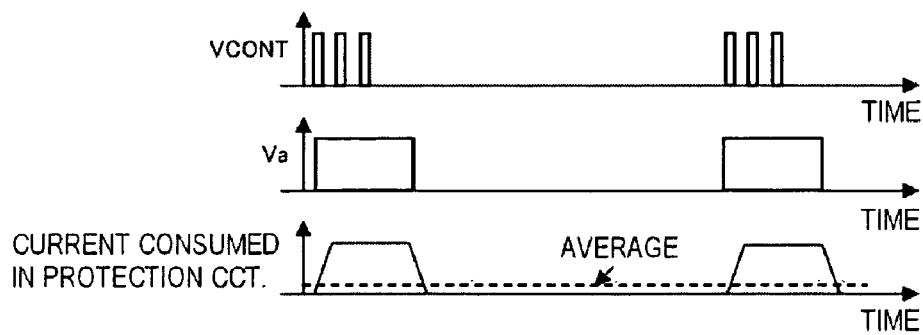
FIG. 4B shows other exemplary waveforms of the pulsed signal VCONT, the signal Va and the consumed current in a protection circuit at light load in the control block according to the embodiment of the invention.
Figure 5:
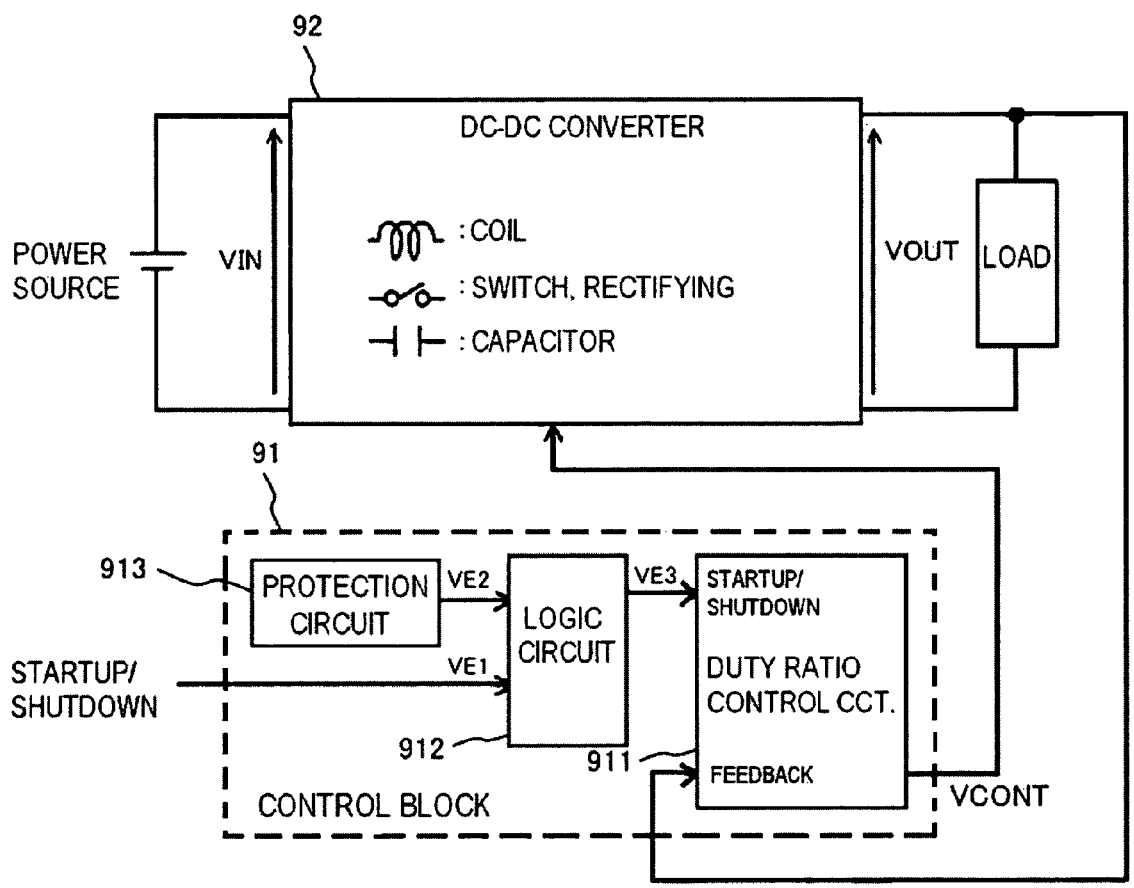
FIG. 5 is a block diagram showing an arrangement of a current ordinary switching power supply system.
Figure 6:
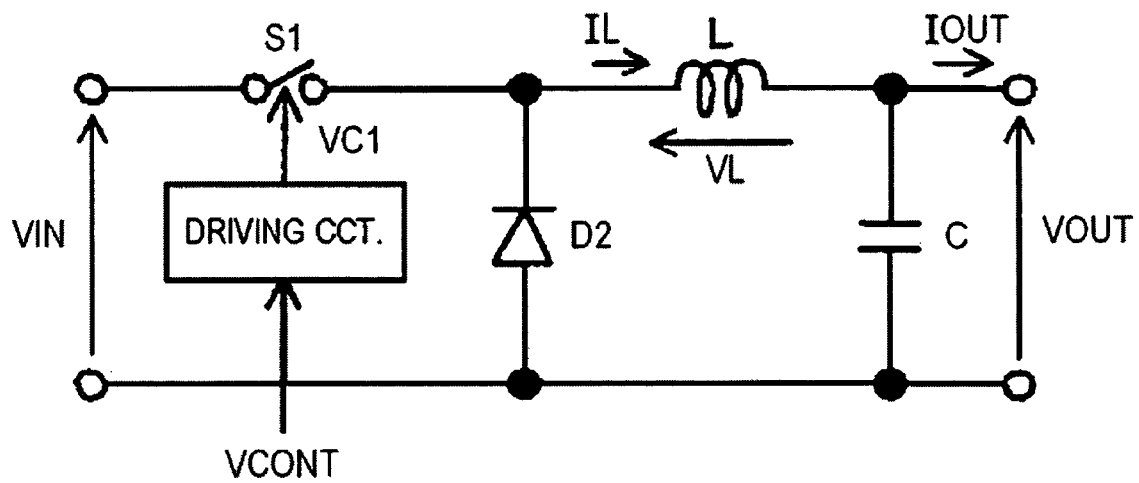
FIG. 6 is a diagram showing a first example of a circuit configuration in which the DC-DC converter in the current switching power supply system shown in FIG. 5 is realized with a down-converter.
Figure 7:
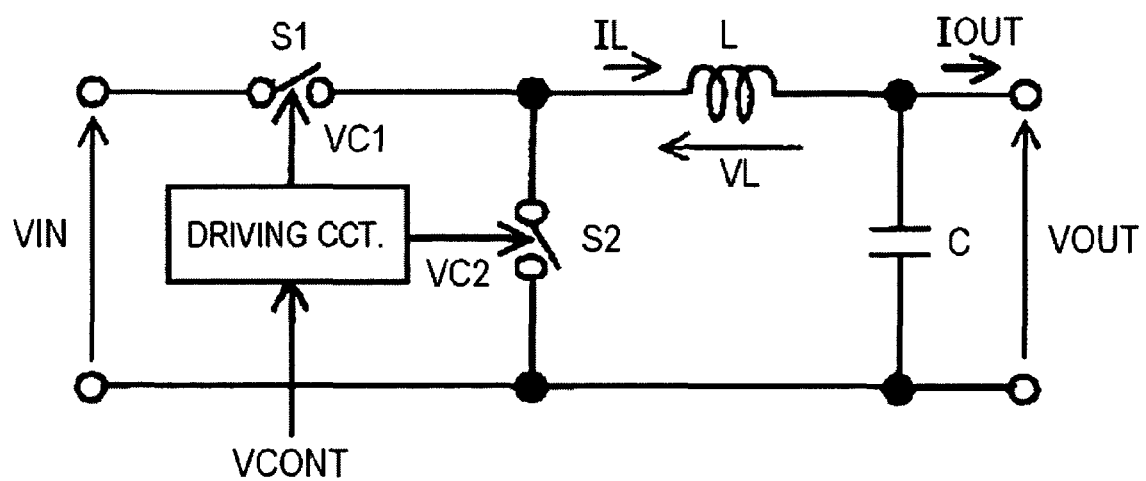
FIG. 7 is a diagram showing a second example of a circuit configuration in which the DC-DC converter in the current switching power supply system shown in FIG. 5 is realized with a down-converter.
Figure 8:
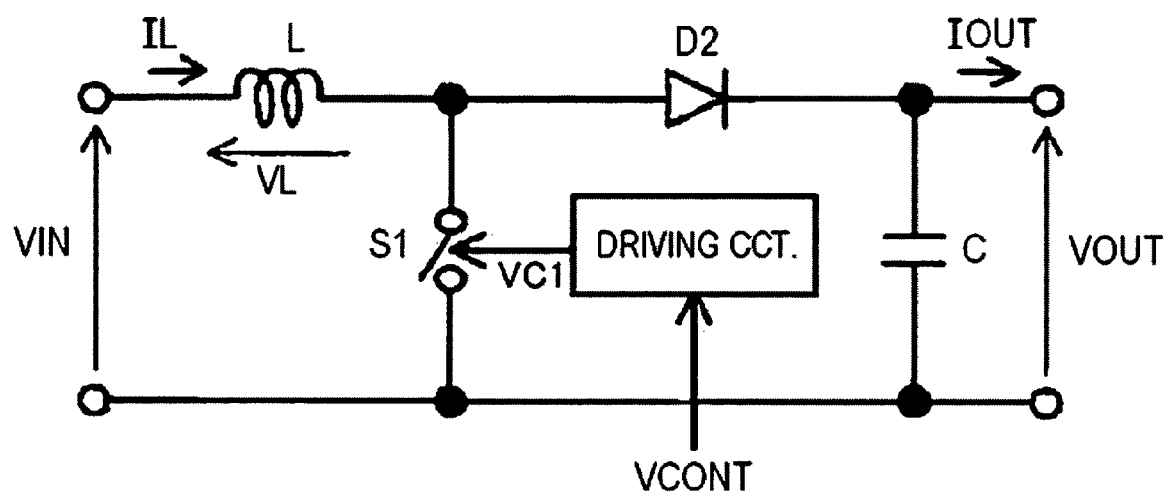
FIG. 8 is a diagram showing a first example of a specific circuit configuration in which the DC-DC converter in the current switching power supply system shown in FIG. 5 is realized with an up-converter.
Figure 9:
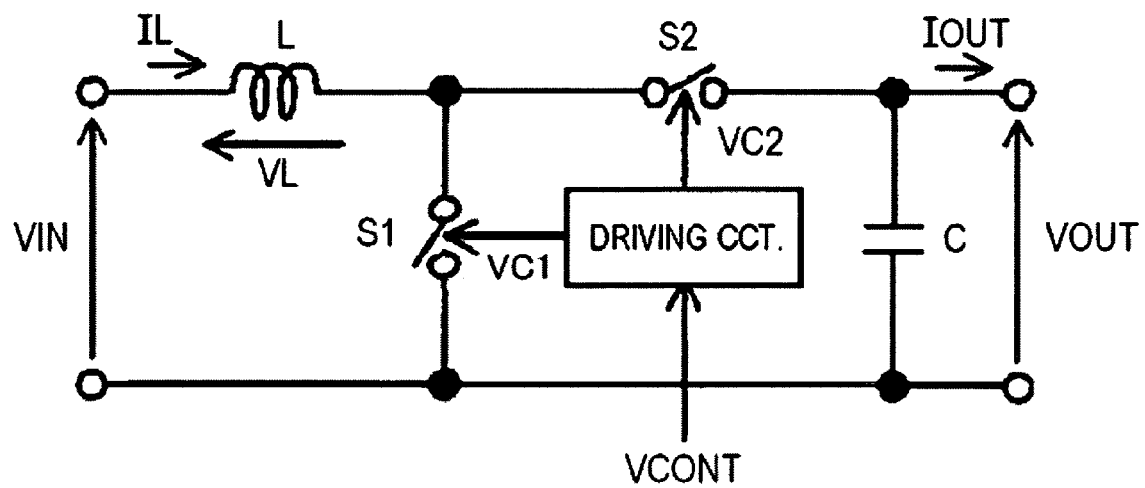
FIG. 9 is a diagram showing a second example of a specific circuit configuration in which the DC-DC converter in the current switching power supply system shown in FIG. 5 is realized with an up-converter.
Figure 10:
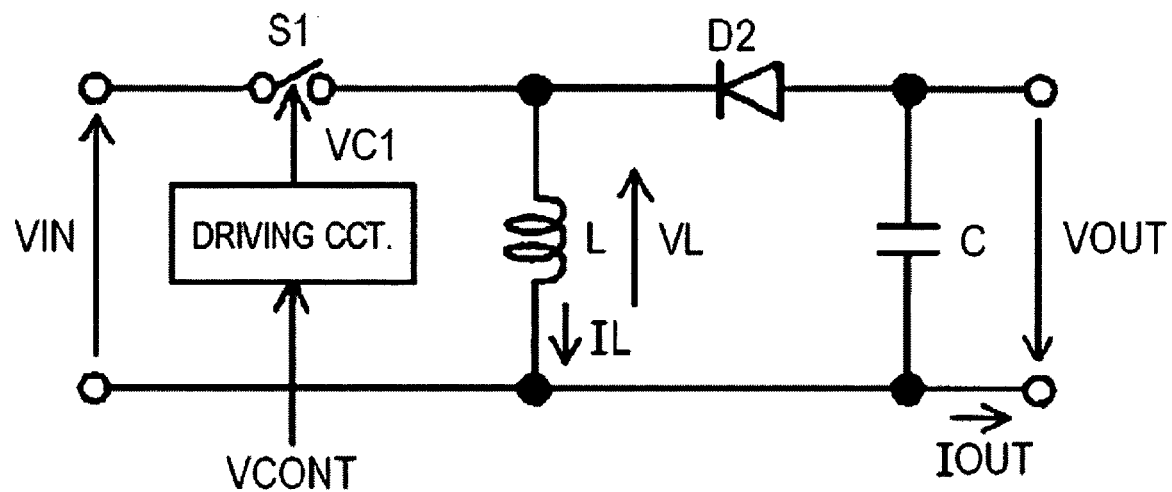
FIG. 10 is a diagram showing a first example of a specific circuit configuration in which the DC-DC converter in the current switching power supply system shown in FIG. 5 is brought into realization with a buck-boost converter.
Figure 11:
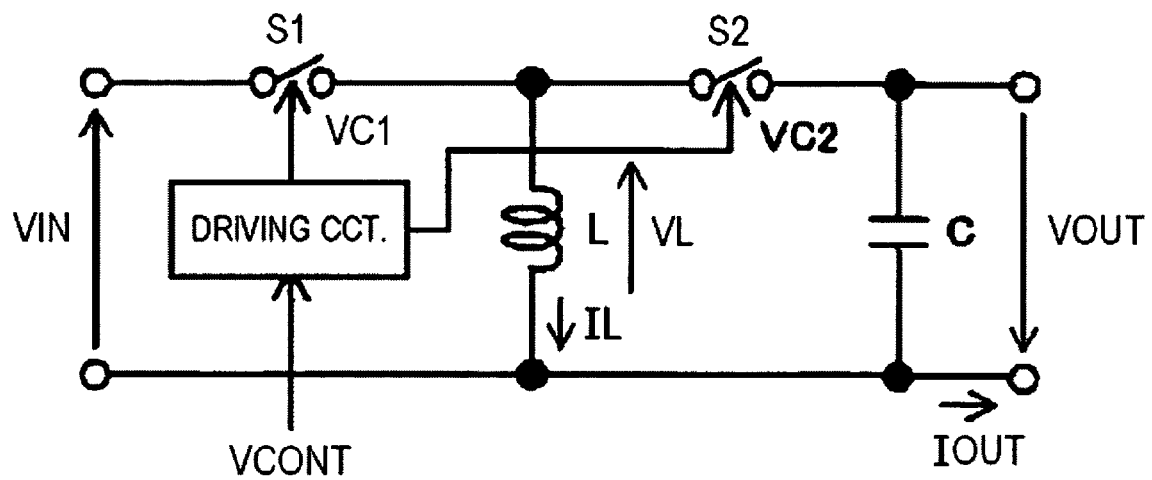
FIG. 11 is a diagram showing a second example of a specific circuit configuration in which the DC-DC converter in the current switching power supply system shown in FIG. 5 is realized with a buck-boost converter.
Figure 12:
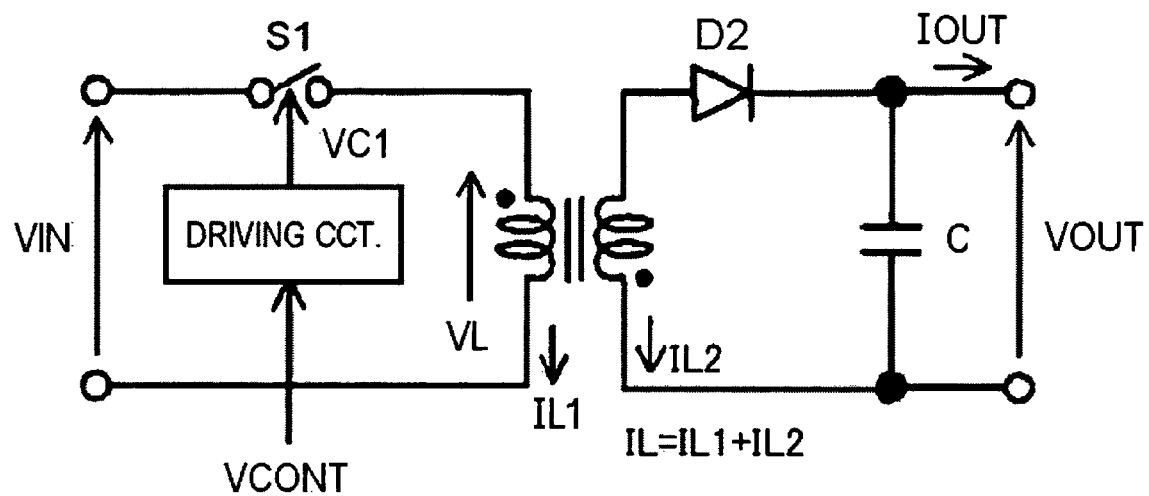
FIG. 12 is a diagram showing a first example of a specific circuit configuration in which the DC-DC converter in the current switching power supply system shown in FIG. 5 is realized with a flyback converter.
Figure 13:
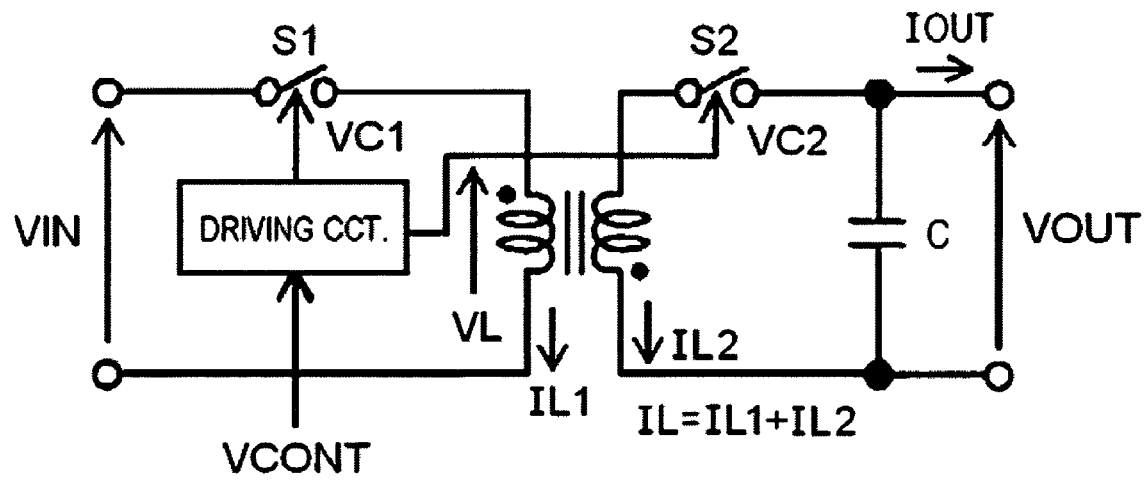
FIG. 13 is a diagram showing a second example of a specific circuit configuration in which the DC-DC converter in the current switching power supply system shown in FIG. 5 is realized with a flyback converter.

FIGS. 4A and 4B are waveform diagrams showing another example of the waveforms of the pulsed signal VCONT, the signal Va and the current consumed in the protection circuit 13 according to the embodiment of the invention. FIG. 4A shows the waveforms at heavy load and FIG. 4B shows the waveforms at light load.

The waveforms in each of FIGS. 4A and 4B are those of the signals and the consumed current when the duty ratio control circuit 11 uses PWM at heavy load and performs intermittent operation at light load.

At a time of heavy load, the waveforms during which are shown in FIG. 4A, a short switching period provided by the pulsed signal VCONT causes the level of the output signal Va of the delay circuit 14 always to be at HIGH, thereby to bring the protection circuit 13 always into an operation state.

At a time of light load, the waveforms during which are shown in FIG. 4B, the average period of switching provided by the pulsed signal VCONT becomes longer causing the period within which the level of the output signal Va of the delay circuit 14 is caused to be at LOW. During this period, the protection circuit 13 is brought to a stand-by state, by which the average current consumption in the protection circuit 13 is reduced. The period of the LOW state of the signal Va becomes longer as the load becomes lighter and longest at no load. As a result, the effect of current consumption reduction in the protection circuit becomes high.

As was explained in the foregoing, by the control circuit and method according to the invention, for a duration of time over which protection is necessary, monitoring by the protection circuit is possible, and for a duration over which no protection is necessary, the protection circuit can be brought into a stand-by state. This enables the efficiency of output conversion to be improved, with internal current consumption at light load or no load being reduced while necessary monitoring is performed.

While the present invention has been particularly shown and described with reference to preferred embodiments thereof, it will be understood by those skilled in the art that the foregoing and other changes in form and details can be made therein without departing from the spirit and scope of the present invention.

What is claimed is:

1. A control circuit of a switching power supply system that controls an output voltage by causing a switching device to turn ON and OFF, the control circuit comprising:
   a control pulse supplying unit configured to supply a pulsed signal that keeps the switching device turned-ON and -OFF;
   a protection circuit configured to shut down the switching power supply system upon occurrence of an abnormality; and
   a delay circuit configured to produce a delay signal in response to which the termination of a state of the pulsed signal, in which state the pulsed signal keeps the switching device turned-ON, is delayed by a specified time duration, the specified time duration being adjusted to be longer than a time necessary for the protection circuit to switch from a stand-by state to an operation state,
   the protection circuit being responsive to one of the pulsed signal and the delay signal to switch between the operation state and the stand-by state.

2. The control circuit as claimed in claim 1, wherein when the duration of the state of the pulsed signal in which state the pulsed signal keeps the switching device turned-ON is longer than a time necessary for the protection circuit to switch from the stand-by state to the operation state, the protection circuit switches between the operation state and the stand-by state in response to the pulsed signal and, when said duration is shorter than the time necessary for the protection circuit to switch from the stand-by state to the operation state, the protection circuit switches between the operation state and the stand-by state in response to the delay signal.

3. The control circuit of a switching power supply system as claimed in claim 1, wherein the control pulse supplying unit outputs the pulsed signal by subjecting the signal to pulse frequency modulation, and controls the switching period of the pulsed signal according to the state of a load or the output voltage of the switching power supply system.

4. The control circuit of a switching power supply system as claimed in claim 1, wherein the control pulse supplying unit outputs the pulsed signal intermittently in a state in which the switching power supply system has either no load and a light load.

5. The control circuit of a switching power supply system as claimed in claim 1, wherein the control pulse supplying unit outputs the pulsed signal by subjecting the signal to pulse frequency modulation if the switching power supply system has either no load and a light load, and outputs the pulsed signal by subjecting the signal to pulse width modulation if the switching power supply system has a heavy load.

6. A switching power supply system having a control circuit that controls an output voltage by causing a switching device to turn ON and OFF, the control circuit comprising:
  a control pulse supplying unit configured to supply a pulsed signal that keeps the switching device turned-ON and -OFF;
  a protection circuit configured to shut down the switching power supply system upon occurrence of an abnormality; and
  a delay circuit configured to produce a delay signal in response to which the termination of a state of the pulsed signal, in which state the pulsed signal keeps the switching device turned-ON, is delayed by a specified time duration, the specified time duration being adjusted to be longer than a time necessary for the protection circuit to switch from a stand-by state to an operation state,
  the protection circuit being responsive to one of the pulsed signal and the delay signal to switch between the operation state and the stand-by state.

7. The switching power supply system as claimed in claim 6, wherein when the duration of a state of the pulsed signal in which state the pulsed signal is keeping the switching device turned-ON is longer than the time necessary for the protection circuit to switch from the stand-by state to the operation state, the protection circuit switches between the operation state and the stand-by state in response to the pulsed signal and, when said duration is shorter than the time necessary for the protection circuit to switch from the stand-by state to the operation state, the protection circuit switches between the operation state and the stand-by state in response to the delay signal.

8. The switching power supply system as claimed in claim 6, wherein the control pulse supplying unit outputs the pulsed signal by subjecting the signal to pulse frequency modulation, and controls the switching period of the pulsed signal according to one of the state of a load and the output voltage of the switching power supply system.

9. The switching power supply system as claimed in claim 6, wherein the control pulse supplying unit outputs the pulsed signal intermittently in a state in which the switching power supply system has either no load and a light load.

10. The switching power supply system as claimed in claim 6, wherein the control pulse supplying unit outputs the pulsed signal by subjecting the signal to pulse frequency modulation if the switching power supply system has either no load or a light load, and outputs the pulsed signal by subjecting the signal to pulse width modulation if the switching power supply system has a heavy load.

11. A method of controlling a switching power supply system that controls an output voltage by turning a switching device ON and OFF and has a protection circuit that produces a signal that shuts down the switching power supply system upon the occurrence of an abnormality, the method including the steps of:
  supplying a pulsed signal that maintains the switching device ON and OFF;
  producing a delay signal that delays the termination of a state of the pulsed signal by a specified time duration in which state the pulsed signal maintains the switching device turned-ON, the specified time duration being adjusted to be longer than a time necessary for the protection circuit to switch from a stand-by state to an operation state; and
  switching the protection circuit between the operation state and the stand-by state in response to one of the pulsed signal and the delay signal.

12. The method of controlling a switching power supply system as claimed in claim 11 wherein the step of switching the protection circuit further includes the steps of:
  comparing the duration of the state of the pulsed signal in which the pulsed signal maintains the switching device turned-ON and a time duration necessary for the protection circuit to switch from the stand-by state to the operation state;
  switching the protection circuit between the operation state and the stand-by state in response to the pulsed signal if in said comparing step the duration is determined to be longer than the time necessary for the protection circuit to switch from the stand-by state to the operation state; and
  switching the protection circuit between the operation state and the stand-by state in response to the delay signal if in said comparing step the duration is determined to be shorter than the time necessary for the protection circuit to switch from the stand-by state to the operation state.

* * * * *